Patented Aug. 1, 1950

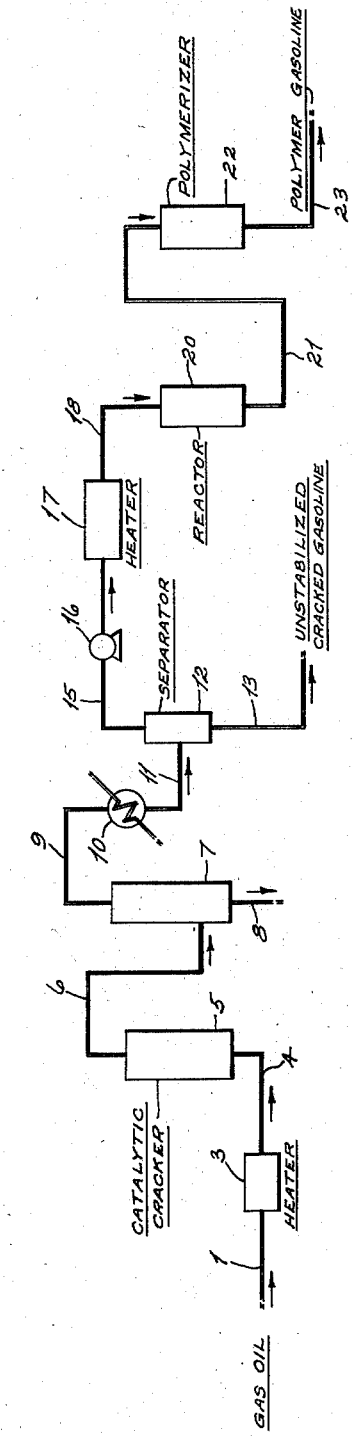

2,517,066

UNITED STATES PATENT OFFICE 2,517,066

MANUFACTURE OF POLYMER GASOLINE

Claude W. Watson, Scarsdale, N. Y., assignor to The Texas Company, New York, N. Y., a corporation of Delaware Application April 17, 1947, Serial No. 742,192

1 Claim. (Cl. 260—683.15)

This invention relates to the catalytic polymerization of olefins derived from catalytic cracking of oil and normally containing a small amount of molecular oxygen. It has particular application to polymerization with catalysts containing a compound of phosphorus such as phosphoric acid and copper pyro-phosphate.

In accordance with the invention, olefinic feed hydrocarbons containing a small amount of oxygen are passed in contact with an oxidation catalyst at elevated temperature and pressure so as to convert molecular oxygen present in the hydrocarbons to oxygenated hydrocarbon compounds, and the so treated hydrocarbons are subsequently passed to the polymerization reaction zone.

It appears that the polymerization feed stocks derived from the catalytic cracking of hydrocarbon oils usually contain small amounts of molecular oxygen, the presence of which is the result of incomplete purging of residual oxygen remaining after regeneration of the cracking catalysts. Usually only traces of such oxygen are present, for example, ranging from 0.001 to 0.1% by weight of the polymerization feed. At any rate, it appears that this small amount of molecular oxygen exerts an adverse influence upon the polymerization operation, forming peroxides which destroy the catalyst and also forming deposits not only upon the polymerization catalyst particles, but within the heating tubes.

Accordingly, the present invention contemplates converting this oxygen present in the polymerization feed into compounds which do not exert a harmful effect upon the polymerization catalyst, so that the active catalyst life can be materially increased. For example, the catalyst life may be more than doubled. The invention contemplates subjecting the olefin feed to contact with an oxidation catalyst such as vanadic oxide ($V_2O_3$) under conditions of temperature and pressure and time of contact effective to convert molecular oxygen into oxygenated hydrocarbon compounds such as formaldehyde. The treatment may result in the formation of other aldehydes as well as other oxygenated compounds such as alcohols. These oxygenated compounds appear to be harmless to the polymerization catalyst and therefore do not poison the catalyst.

The catalytic removal of oxygen in this fashion involves an exothermic reaction which may be used to supply a portion, or all, of the pre-heating required for the subsequent polymerization reaction.

While mention has been made of using an oxidation catalyst comprising vanadic oxide, nevertheless, it is contemplated that other active oxides of vanadium may be employed. Under equilibrium operating conditions, the catalyst may actually consist of a mixture of higher and lower oxides of the metal. It is also contemplated that still other catalysts selected from groups V, VI, VII and VIII of the periodic system including catalysts of the iron type, can be employed. However, preferred catalysts are the oxides of vanadium, manganese and iron, and in that order. It is also preferred to employ a catalyst which is resistant to sulphur.

The oxidation catalyst can be used in the form of a stationary bed of solid particles or in the form of a fluidized mass of solid particles.

Reference will now be made to the accompanying drawing for further description of the invention.

As indicated in the drawing, gas oil is obtained from a source not shown and conducted through a pipe 1 to a heater 3 wherein it is vaporized and heated to cracking temperature, for example, ranging from about 800 to 950° F. The resulting hot vapor is conducted through pipe 4 to a reaction vessel 5 of the catalytic cracking unit.

In the vessel 5, the vapors are passed in contact with a solid cracking catalyst which may be of the mineral earth type such as fuller's earth or may be of a synthetic silica-alumina type. The cracking catalyst is usually employed in the form of a fluidized mass of solid particles although it is contemplated that other catalyst techniques may be employed.

The reactor 5 is merely indicated in diagrammatic form, and in practice will include means for regeneration of the used catalyst, such regeneration involving treatment with air or other oxygen containing gas to effect removal of carbonaceous material from the catalyst particles.

The hydrocarbon products of the cracking reaction containing traces of oxygen, flow through a pipe 6 to a fractionating tower 7, wherein the gasoline and lighter hydrocarbons are fractionated from the higher boiling material. The higher boiling material is removed through a pipe 8 for recycling to the catalytic cracking reaction or for such other disposition as may be desired.

The gasoline fraction, including gaseous hydrocarbons is conducted through pipe 9 and cooler 10 and from there through a pipe 11 to a separating vessel 12. The hydrocarbon stream is cooled in the cooler 10 to a temperature in the range of 100 to 250° F. and preferably to about 200° F. The pressure is substantially the same as that prevailing in the catalytic cracking reaction and ranges from substantially atmospheric to about 10 or 15 pounds.

In the separator 12, separation into gaseous and liquid fractions occurs. The liquid fraction comprising gasoline hydrocarbons and containing a small amount of $C_3$ and $C_4$ hydrocarbons is drawn off from the separator through a pipe 13. This fraction comprises unstabilized cracked gasoline which may be stabilized and otherwise treated for the production of finished gasoline.

The gas fraction formed in the separator 12 comprises $C_4$ and lighter hydrocarbons including the aforesaid small amount of oxygen. This hydrocarbon fraction usually contains about 25 to 30% $C_3$ and $C_4$ olefins, depending upon the operating conditions prevailing in the cracking operation.

The $C_4$ and lighter gaseous fraction is removed through a pipe 15 and forced by a compressor 16 into a heater 17, wherein the gas is raised to a temperature of about 300 to 500° F. and while under a pressure of several hundred pounds or more, the pressure being substantially that prevailing in the subsequent polymerization operation.

The so heated gaseous fraction is conducted from the heater through a pipe 18 to a reactor 20. In the reactor 20, the hot gas is passed in contact with a solid oxidation catalyst comprising vanadic oxide maintained at a temperature in the range of 350 to 500° F. The catalyst is in the form of a stationary mass of solid particles and the hot gas is caused to flow therethrough with a space velocity in the range of about .5 to 10 volumes of gas (measured at standard conditions per volume of catalyst per hour).

As a result of contact with the oxidation catalyst, the molecular oxygen present in the gas is converted to oxygenated compounds and comprising mainly aldehydes. Conditions of temperature and pressure are maintained within the reactor 20 so that the hydrocarbons are maintained above their dew point.

The resulting treated hydrocarbons containing oxygenated compounds are moved as an effluent stream through pipe 21 to a polymerization reaction vessel 22. Since the reaction occurring in the reactor 20 is of an exothermic nature, the effluent stream usually will not require any further pre-heating prior to the polymerization reaction. However, provision may be made for either supplying heat to or removing it from the effluent stream so as to adjust its temperature prior to introduction to the polymerizer.

In the polymerizer 22, the olefinic gases are passed in contact with a solid polymerization catalyst comprising charcoal silica or silica-Kieselguhr impregnated with phosphoric acid. The polymerization reaction is carried out at a temperature of about 450 to 500° F. and under a pressure ranging from about 800 to 1200 pounds per square inch gauge. Under these conditions, $C_3$ and $C_4$ olefins undergo polymerization to form polymer gasoline. The effluent stream of polymer product is withdrawn through a pipe 23 and will comprise polymer gasoline, unreacted olefins, such as ethylene, and paraffinic hydrocarbon gases as well as the oxygenated compounds formed in the reactor 20. This polymer product may be fractionated to effect stabilization.

Provision may be made if desired for recovering the aforesaid oxygenated compounds from the gaseous and normally liquid portions of the polymer product.

Other types of solid polymerization catalysts, which are adversely affected by the presence of oxygen in the polymerization reaction, may be employed in the polymerizer 22, as for example, a catalyst comprising cupric pyrophosphate. The catalyst may also comprise phosphates of other metals such as cadmium, zinc, iron, aluminum, cobalt magnesium. On the other hand a polymerization catalyst of the silica-alumina type may be employed. Furthermore, the polymerization catalyst may be used in the form of a stationary mass of solid particles or in the form of a fluidized mass of such particles.

I claim:

In the catalytic polymerization of gaseous olefinic hydrocarbons derived from catalytic cracking of oil and containing a small amount of molecular oxygen, a method comprising heating an olefinic stream of $C_4$ and lighter hydrocarbons containing said oxygen to a temperature in the range of about 300° F. and higher, passing said heated mixture through a mass of solid particles of an oxidation catalyst comprising vanadic oxide in an oxidation zone at a space velocity in the range of about 0.5 to 10 volumes of feed gas (measured at standard conditions) per volume of catalyst per hour, maintaining conditions of temperature and pressure in said oxidation zone such that the hydrocarbons are maintained above their dew point, effecting in said oxidation zone conversion of said molecular oxygen into oxygenated hydrocarbons comprising mainly aldehydes with liberation of exothermic heat of reaction, removing from said oxidation zone an effluent stream of heated hydrocarbons containing resulting oxygenated compounds, passing said effluent stream without further heating to a polymerization zone containing a polymerization catalyst comprising phosphoric acid, effecting contact with said polymerization catalyst under elevated pressure at a temperature in the range of about 450° F. to 500° F. such that polymerization of said olefins is secured, the effective life of the polymerization catalyst being materially greater than it is when said oxidation treatment of the feed is omitted, and removing from the polymerization zone a product stream containing polymer gasoline and said oxygenated hydrocarbons.

CLAUDE W. WATSON.

REFERENCES CITED

The following references are of record in the file of this patent:

UNITED STATES PATENTS

| Number | Name | Date |
|---|---|---|
| 2,216,552 | Gage | Oct. 1, 1940 |
| 2,351,167 | Ware | June 13, 1944 |
| 2,381,707 | Wood et al. | Aug. 7, 1945 |
| 2,436,571 | Heinrich | Feb. 24, 1948 |